United States Patent [19]

Burn

[11] 4,283,753
[45] * Aug. 11, 1981

[54] LOW FIRING MONOLITHIC CERAMIC CAPACITOR WITH HIGH DIELECTRIC CONSTANT

[75] Inventor: Ian Burn, Williamstown, Mass.

[73] Assignee: Sprague Electric Company, North Adams, Mass.

[*] Notice: The portion of the term of this patent subsequent to Jan. 3, 1997, has been disclaimed.

[21] Appl. No.: 79,685

[22] Filed: Sep. 28, 1979

[51] Int. Cl.$^3$ .................. H01G 4/12; C04B 35/46
[52] U.S. Cl. .................. 361/321; 361/320; 106/73.31; 252/520
[58] Field of Search .............. 361/320, 321, 322; 106/73.3, 73.31; 252/62.3 BT, 63.2, 63.5, 520

[56] References Cited

U.S. PATENT DOCUMENTS

| | | | |
|---|---|---|---|
| 3,609,483 | 9/1971 | Smyly | 252/520 X |
| 3,811,937 | 5/1974 | Maher | 106/73.31 X |
| 3,845,365 | 10/1974 | Hicks | 361/320 |
| 3,885,941 | 5/1975 | Maher | 106/73.3 X |
| 3,900,773 | 8/1975 | Bowkley et al. | 361/320 X |
| 3,977,887 | 8/1976 | McIntosh | 106/73.31 X |
| 3,997,457 | 12/1976 | Takahashi et al. | 252/63.5 |
| 4,066,426 | 1/1978 | Maher | 106/73.3 X |
| 4,081,857 | 3/1978 | Hanold | 361/321 |
| 4,101,952 | 7/1978 | Burn | 361/320 X |
| 4,106,075 | 8/1978 | Baumann et al. | 361/320 |
| 4,120,677 | 10/1978 | Burn | 106/73.3 X |

*Primary Examiner*—Gene Z. Rubinson
*Assistant Examiner*—E. F. Borchelt
*Attorney, Agent, or Firm*—Connolly and Hutz

[57] ABSTRACT

The ceramic body of a monolithic ceramic capacitor consists of a granular barium titanate phase and a relatively low temperature melting intergranular phase. The body is capable of exhibiting a very high dielectric constant, e.g., over 5000, a Curie temperature of near 25° C., and may be fired to maturity at 1150° C. or lower and contain low cost buried electrodes. These properties obtain from a narrow range of compositions for which charge balance and large/small cation stoichiometry in the total formulation are found to be very critical. Cd, Zn, Cu, Li and Na are found to enter the grains as large acceptor cations on Ba sites and may be charge compensated by the small donor cations of charge +5, Bi, Sb, Nb and Ta or by the small donor cations of charge +6, W and Mo, on the Ti sites. At least 0.3 mole percent of glass-former cations are desirable for establishing a low melting flux during sintering but more than 2.2 mole percent glass-formers tends to reduce the dielectric constant.

12 Claims, 6 Drawing Figures

LOW FIRING MONOLITHIC CERAMIC CAPACITOR WITH HIGH DIELECTRIC CONSTANT

BACKGROUND OF THE INVENTION

This invention relates to monolithic ceramic capacitors having low-melting metal film electrodes that are buried in a dielectric ceramic body having a high-temperature-firing granular barium titanate phase and a low melting intergranular phase.

In ceramic bodies of this type, a sintering aid or low melting flux is employed. Most often the flux is a glass frit as is described in the patents to G. H. Maher, U.S. Pat. No. 3,885,941 issued May 29, 1975 and to I. Burn, U.S. Pat. No. 4,120,677 issued Oct. 17, 1978. The addition of such fluxes to the ceramic start materials has the highly beneficial results that the temperature at which the ceramic may be fired to maturity is reduced, lower cost buried electrodes of silver-containing and other low-melting metals may be co-fired without their melting and running out, and volatile elements such as lead, bismuth and cadmium may be more readily incorporated in the dielectric to achieve improved electrical properties.

However, increasing amounts of flux leads to a reduction in the overall dielectric constant (K) of the body because the volume of low K grain boundary phase increases. Heretofore, it has been necessary to include about 10 weight percent flux or glass with the ceramic precursor materials to achieve full densification of the body at temperatures under 1150° C. But with so much flux added, the dielectric constant at about room temperature is usually less than 2000 and seldom as high as 4500.

It is known to add zirconates and/or stannates to barium titanate to lower the Curie temperature to a point near room temperature. Unfortunately, incorporation of zirconium and tin compounds in barium titanate raises the firing temperature required for full densification of the body. In the patent to G. H. Maher, U.S. Pat. No. 4,066,426, issued Jan. 3, 1978, it is taught that small additions of cadmium substantially reduce the amount of zirconate that must be included to achieve a given downward shift in the Curie temperature.

It is an object of the present invention to provide a monolithic ceramic capacitor capable of being fired at less than 1150° C., wherein the ceramic body has a relatively high dielectric constant at near room temperature.

It is a further object of this invention to provide such a capacitor containing an amount of cadmium and donor ion that is optimum for bringing the Curie temperature down and maximizing the dielectric constant of the body at about room temperature.

It is a further object of this invention to provide such a capacitor wherein there may be substituted for some or all of the especially volatile and poisonous cadmium, other cations capable of entering the barium titanate crystal lattice on the large cation sites with a charge of one.

SUMMARY OF THE INVENTION

A ceramic capacitor includes at least two spaced metal electrodes in contact with a ceramic body. The ceramic body is so formulated that it is capable of having been fired at 1150° C. permitting the use of low cost buried electrodes that melt at a low temperature namely as low as about 25° C. higher than the firing temperature. Such monolithic capacitors of this invention thus have buried electrodes that melt at less than 1175° C.

The body contains a major portion of barium titanate. The barium titanate is contained in a high melting granular phase. There is a relatively low melting intergranular phase containing one or more of the glass-formers.

In one aspect of the invention, the ceramic body is so formulated that the positive ions in both phases together consist essentially of a number $N_D$ of large divalent ions selected from Ba, Pb, Sr, Ca, and combinations thereof; a number $N_Q$ of small quadravalent ions selected from Ti, Zr, Sn, Mn, and combinations thereof; a number $N_X$ of small pentavalent and sexavalent ions selected from Bi, Nb, Ta, Sb, W, Mo, and combinations thereof; a number $N_{CC}$ of charge compensating ions capable of having a valence of +1 as a large cation selected from Zn, Cu, Li, Na, and combinations thereof; and a number $N_G$ of glass forming ions selected from B, Si, Ge, P, V and combinations thereof. A number $N_{X'}$ corresponds to the number of available small donor charges that may be compensated by the number of large acceptor ions in the grain, $N_{CC}$. These small donor charges are $$\tfrac{1}{2}N_{Bi}+N_{Nb}+N_{Ta}+N_{Sb}+2N_W+2N_{Mo}=N_{X'}.$$

Charge balance, stoichiometry in large and small cations, and a near eutectic liquid flux at sintering are substantially assured by $$0.5 \leq \frac{N_{CC}}{N_{X'} + N_G - (N_D - N_Q)} \leq 1.9$$

The ratio of the number of glass-former cations to all cations in the body, $$\frac{N_G}{N_X + N_{CC} + N_G + N_D + N_Q},$$

must be no less than about 0.003 to avoid porous bodies, and to promote grain growth by effective fluxing action at sintering.

In another aspect of the invention, the above noted number of charge compensation ions, $N_{CC}$, is predominantly cadmium, $N_{Cd}$, and the aforesaid available donor charge $N_{X'}$ is no greater than the number of glass-former cations, $N_G$. These conditions lead to very high dielectric constants, e.g., as large as 5000, when the ceramic formulation also conforms to $$0.77 \leq \frac{N_{Cd}}{N_{X'} + N_G - (N_D - N_Q)} \leq 1.47 \text{ and}$$

$$0.003 \leq \frac{N_G}{N_X + N_{Cd} + N_G + N_D + N_Q} \leq 0.022$$

It has been discovered that in the production of barium titanate based ceramic bodies, a much smaller amount of flux need be included with the ceramic start materials than that previously thought to be required for maturing the ceramic at a given temperature, if certain rules, to be described, are followed for formulating the flux and ceramic-precursor start materials.

When impurities are present in the start powders, namely cations other than barium and titanium, they may enter the barium titanate lattice during firing provided the size and charge of the impurities are about the same size and charge as barium (charge +2 and cation radius 1.35 Å) or titanium (charge +4 and cation radius 0.68 Å). Impurity cations having an ionic radius greater than about 0.85 Å (referred to herein as large cations) tend to enter the crystal lattice on the barium sites at firing, e.g. displacing barium there or filling a barium vacancy. Impurity cations having an ionic radius less than about 0.85 Å but greater than about 0.55 Å (referred to herein as small cations) tend to enter the lattice on the titanium sites.

The metal ions of the common glass-forming oxides such as boron and silicon have ionic radii less than 0.55 Å and normally do not enter the titanate lattice to any substantial degree. Because glass-forming oxides form low melting compounds with other oxides that may be present in ceramic formulations (e.g., CdO and $Bi_2O_3$), such low melting compounds are commonly used as fluxes.

The use of such fluxes permits firing of the ceramic at reduced temperatures by a liquid-phase sintering process wherein there occurs simultaneously a dissolution and recrystallization of the ceramic. When densification is complete, flux remains in the grain boundaries of the ceramic. It has been found that the flux composition may change during the sintering process; some cations in the flux may preferentially enter the crystalline ceramic phase while others leave the crystalline phase and enter the flux. Consequently, the composition of the start ceramic powder and flux must be considered in its entirety. The presence of a glass former element in the flux is greatly preferred because it maintains a liquid reservoir during sintering owing to its insolubility in the lattice and its reactivity with other oxides in the ceramic. Boron is the preferred glass former because it forms very low melting eutectic compounds with one or more of the large cation containing oxides present among the start ingredients.

In order to achieve a high dielectric constant, it is a major objective at firing to achieve in the process of grain growth a homogenous dispersion of impurity ions in the grains and a maximum densification of the ceramic body (i.e. absence of porosity). Less than full densification of a body at firing is often the result of insufficient or ineffective flux and often leads to low insulation resistance. This is typically remedied in the prior art by increasing the firing temperature.

It is postulated here that densification with incomplete homogenization of impurity ions during firing is a result of compositional incompatibility between the high firing ceramic constituents and the low melting flux. The composition of the ceramic grains determines the operating temperature at which the dielectric constant is maximum (the Curie temperature). The dielectric constant of the body is ordinarily diminished by the presence of a second low dielectric constant phase, i.e., the phase containing the insoluble glass-former elements, so that the proportional amount of this second phase is desirably reduced to the amount just sufficient to provide the above-said liquid reservoir during sintering and to provide sufficient volume to just fill the spaces between the ceramic grains. It has been found that these conditions approximately correspond to there being in the ceramic body a number of glass-former cations amounting to from 0.3 to 2.0 percent of the total number of cations in the body.

It has been discovered that homogenization at firing is considerably enhanced when (1) the balance between large and small cations is carefully adjusted in the ceramic and flux start materials, and when (2) aliovalent impurity cations are charged balanced. Charge balance occurs when for each small cation of charge +5 (donor cation) such as niobium (+5) that enters the lattice, there is available a monovalent large cation such as cadmium (acceptor cation). Together their charge is balanced with respect to the barium (+2) titanium (+4) lattice. Likewise, when tungsten is present, each tungsten ion of charge +6 may be balanced by two large cations of charge +1.

It has further been discovered that when bismuth (usually in the form of $Bi_2O_3$) is included in the start materials, it appears to enter the lattice at least partially as a small cation ($Bi^{+5}$ of radius 0.74 Å) on titanium sites. Other small cations that enter the lattice on titanium sites with a charge of +5 are antimony, niobium and tantalum. These small pentavalent ions can be balanced in the grain by a corresponding number of large cations with a charge of +1. Cadmium, copper and zinc apparently enter the ceramic with a +1 charge, even though they may first appear in the start materials as oxides (CdO, CuO and ZnO) with an initial charge of +2. Lithium and sodium also can enter the grains as large cations of charge +1 when accompanied by small penta- or hexavalent cations.

It has further been discovered that when the starting flux contains a large cation, potentially of +1 charge (i.e., Cd, Zn, Cu, Li and Na), and no +5 element is available, the grains can take in only a minor amount of the monovalent ion (e.g. 0.2 weight percent cadmium); but a much greater amount of the monovalent ion enters when sufficient bismuth or other pentavalent or hexovalent compounds are present, (e.g., as much as 1.5 weight percent cadmium can then be accomodated in the barium titanate lattice).

Thus, when there is available in the start materials an equal number of large and small replacement cations of balanced charge and the remaining material has a composition wherein the ratio of the number of large cations to the number of glass-former ions is about 1.0, the inherent tendency of the ceramic grains to become stoichiometric at firing becomes stronger, leading to grain growth, homogenization, and densification at a minimum firing temperature. Further, for compositions so balanced, the material remaining in the grain boundaries after firing is a relatively small amount because during sintering the grains readily incorporate large/small aliovalent cation pairs or sets of balanced charge. From the foregoing it will be appreciated that the range of formulations of this invention represents a tiny fraction of possible barium titanate compositions.

DESCRIPTION OF THE PREFERRED EMBODIMENTS

In a series of experiments, Examples 1 through 16, a number of chip capacitors were made having a ceramic body composed of a major proportion $BaTiO_3$ plus minor amounts of $SrZrO_3$, $Bi_2O_3$, CdO and $B_2O_3$. First, a ceramic powder mixture was prepared including $BaTiO_3$ powder and varying amounts in powder form of the other above named constituents. Each mixture was combined with an organic vehicle to form a ceramic paint or slip suspension. The slip was cast on a glass plate using a doctor blade technique. When dry, the cast layer was cut into squares of about 10 mm × 10 mm × 0.5 mm. The squares were heated at about 750° C. to remove the organic material and were subsequently fired in a closed crucible at 1100° C. for 2½ hours. Silver electrodes were then applied to the opposite major faces of each fired square.

The formulations of the ceramic mixtures are given in Table I. Also listed for each example are the approximate dielectric constants (K) and Curie temperatures ($T_c$). The determination of dielectric constants involved measuring the capacitance and the physical dimensions of each square from which the dielectric constant was calculated. For such cast capacitors, the variation in the thickness of the squares and the degree of overlap of opposite electrodes on each square varied such that the uncertainty of these determinations for K was no less than 10%. There are noted in two other columns of Table I indications of deficiencies when present in the fired ceramic bodies, namely the appearance of dark spots in the body (designated ●) and the achievement of little grain growth in the body (designated ☐). Of course, it is essential to have grain growth to realize very high dielectric constants by obtaining compositional homogenization of the granular phase. The dark spots are conductive and were determined to be oxides of cadmium (black CdO or blue $Cd_2O$) which could not be accomodated by dissolution into the grains or in the intergranular phase of the ceramic during firing.

Figure 1:
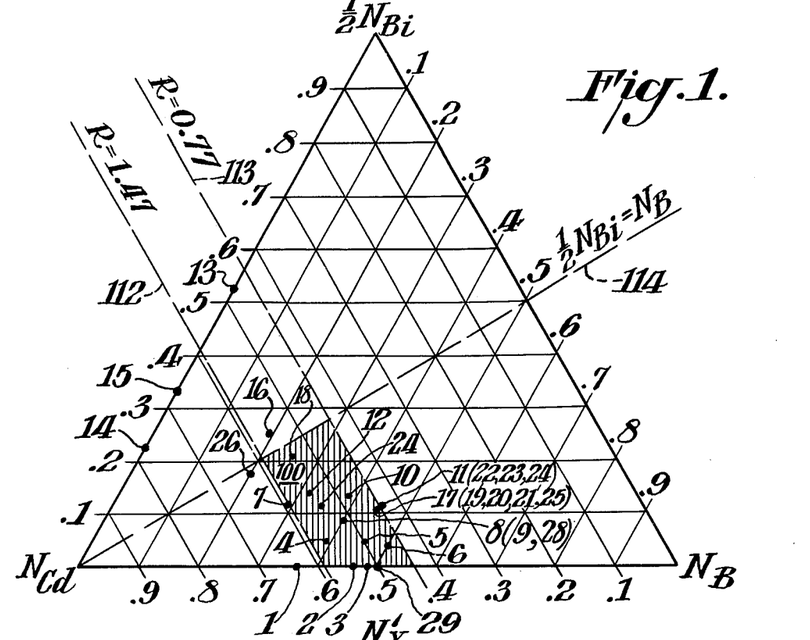
FIG. 1 shows a ternary compositional diagram representing a minor portion of ceramic compositions of this invention.

The compositions of each of the Examples 1 through 16 are represented by a particular point in the ternary compositional diagram shown in FIG. 1. It is seen from Table I and from inspection of the diagram in FIG. 1, that a small range of compositions within area 100 being bounded by lines 112, 113 and 114 provide ceramic bodies having good grain growth, no cadmium precipitation and a dielectric constant that is greater than about 5,000 near room temperature.

Figure 2:
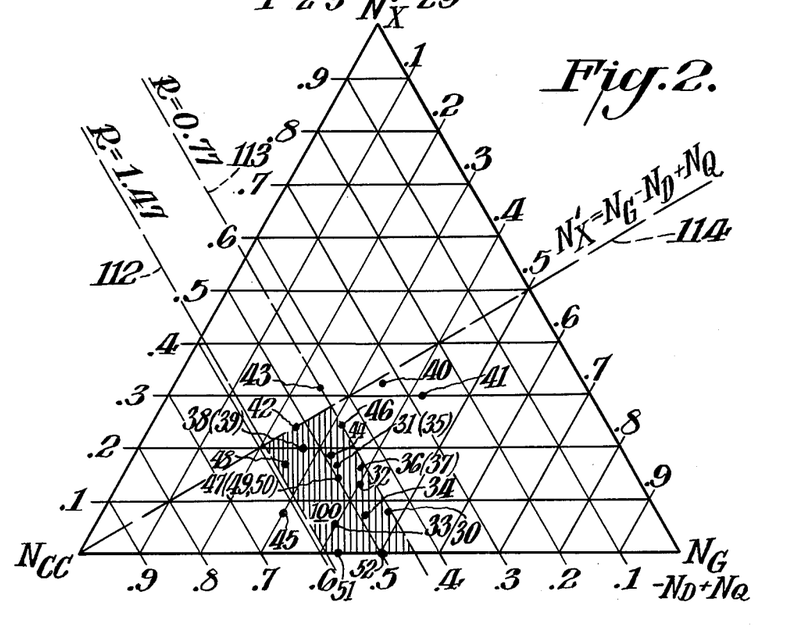
FIG. 2 shows another ternary compositional diagram representing other ceramic compositions of this invention.

Lines 112, 113 and 114 in FIG. 1 are described by the relationships $R = N_{Cd}/(N_{Bi}/2 + N_B) = 1.47$, $R = N_{Cd}/(N_{Bi}/2 + N_B) = 0.77$ and $N_{Bi} = N_B$, respectively, and thus all compositions having a point within the region bounded by lines 112, 113 and 114 in FIG. 2 meet the conditions $$0.77 < \frac{N_{Cd}}{N_{Bi}/2 + N_B} < 1.47$$

and $$N_{Bi} < N_B,$$

wherein N is the number of atoms and the subscript (e.g. B) identifies the element (e.g. boron).

It is deduced from these examples and from others to be presented herein, that for optimum grain growth, densification and dielectric constant in the ceramic body, the molar ratio of cations present in the ceramic formulation given above as $$\frac{N_{Cd}}{N_{Bi}/2 + N_B},$$

must be approximately 1.0.

The examples 1–16 are representative of experiments wherein the material formulations were restricted essentially to a barium titanate-zirconate combined with cadmium, bismuth, and boron.

Electron probe microanalysis of these materials that have good grain growth reveals that when Bi is present, virtually all of the Bi in the flux is incorporated in the grains of the material during sintering, and that the level of Cd in the grains increases. The Cd level in the grains were found to increase at about half the rate at which Bi was added to the compositions. The cadmium not needed for balancing the charge of the bismuth in the grains is "soaked up" by the boron in the intergranular phase of the material. When not enough boron is present (R greater than 1.47), this excess cadmium precipitates and forms the above described dark spots, and at the same time the dielectric constant (K) of the material diminishes. When the molar amount of the above said excess cadmium is about equal to that of the boron, a eutectic flux composition is formed further tending to reduce the lowest temperature at which densification and grain growth occurs. Thus, the molar ratio equal to unity satisfies the condition that the charge is balanced in the grains while at the same time the composition of the flux is about eutectic.

However, it is also important for grain growth that the ratio of large to small cations in the composition be about unity also.

A molar ratio $$R = \frac{N_{Cd}}{N_{Bi}/2 + B - (N_D - N_Q)},$$

being about unity, generally satisfies the later condition too. The rationale here is that an excess of large divalent cations over small quadravalent cations displaces cadmium, either in the grains or in the flux, and may upset the charge balance or the desired flux composition. Similarly, an excess of small over large cations are believed to lead to intergranular secondary titanate phases that interfere with the charge balance sought. Accordingly, after insuring that the primary relationship between the available cadmium, bismuth and boron provides the above said advantageous ratio of about unity, it is often necessary to add a quantity of either a large divalent cation (e.g. barium oxide) or a quantity of a small quadravalent cation (e.g. titania) to achieve stoichiometry between the large and small cations in the grains. In practice this is most readily accomplished empirically since the amount of the needed additive e.g., BaO, $TiO_2$, etc., is usually less than 1 weight percent of the total ceramic precursor powder mixture. The need for a few more large cations is indicated by densification without grain growth while the need for more small cations is indicated by the appearance of dark spots and/or a lower dielectric constant than expected. For best performance, however, the excess of large over small cations, or vice versa, should remain small, more particularly less than about 3 times the level of the glass-formers in the formulation, or $N_D - N_Q < N_G$.

In Examples 13 through 16, the molar ratio $N_{X'}/N_G$ of the number of pentavalent cations capable of entering the grains ($N_{X'} - \frac{1}{2}N_{Bi} + N_{Nb}$) to the number of glass-former cations is greater than about 1.0 and the dielectric constants are lower and all are less than 5000. The molar ratio R for Examples 2 and 3 is near unity and there was grain growth but the room temperature K was less than 5000 because there was too much of the glass-former leading to a higher amount of the intergranular phase in the body. Also, the Curie temperatures were high, i.e., above the desired range of from 0° to 45° C.

The Curie temperatures of Examples 5 and 6 are near room temperature but there was so much glass-former (i.e. boron) that a K of 5000 was still not achieved. However, with a Curie temperature centered at 32° C., and an R centered at 1.03, and with a central location in the shaded region 100 of FIG. 1, the capacitors of Example 9 have a K at 25° C. of 6000 even though the molar percent of glass-formers is rather high at 2.2%. Capacitors of Examples 10 and 12 have too much bismuth in combination with strontium zirconate driving down the Curie temperature, i.e., below the desired range 0°–45° C. Charge compensated bismuth is seen to be a powerful Curie point depresser in combination with zirconium (and tin). The R factor in Example 11 is low and solid solution of the zirconium in the barium titanate was not achieved, as indicated in Table I by the notation "mixed phase".

In a related experiment, Example 17, the cadmium is introduced as $CdTiO_3$ instead of as CdO. The following powders, in parts by weight, were combined: 82.0 $BaTiO_3$, 8 $SrZrO_3$, 0.1 $MnCO_3$, 4.5 $CdTiO_3$, 2 $Bi_2O_3$, 0.15 amorphous boron (B) and 2.0 BaO. Square wafers were formed and fired at 1100° C. for 2½ hours producing a dense ceramic with grains having an average size of about 10 microns, a Curie point of 2° C. and a dielectric constant of about 6000. The barium oxide was added to achieve stoichiometry in the grains between the large and small cations. Good properties are thus obtained when both charge balance and stoichiometry are achieved, no matter in what form the ingredients appear in the ceramic precursor mixture.

In the chip capacitors of Example 18, the pentavalent cations are niobium instead of bismuth and the value of the molar ratio R is calculated wherein it is assumed that all of the niobium atoms are pentavalent and enter the grains on the small cation sites. These capacitors have a DF of 3.3% of K of 6000 and a Y5U temperature characteristic (relative to room temperature, the K drops no more than 56% between −55° C. and +85° C.). The bodies were marginally porous but a slight increase in the amount of CdO and B would be expected to give improved densification with minor changes in these excellent electrical properties.

Only the ceramic formulations in Table I of Examples 9, 17 and 18 meet all of the following criteria: no more than 2.2 mole percent glass-former cations, Curie temperature of from 0° to 45° C., K at 25° C. of 5000 or greater, and point in ternary diagram of FIG. 1 lies in preferred region 100. The capacitors of Example 4 would have been expected to have a higher K and meet all others of the above noted criteria. This Example 4 is believed to represent a situation wherein the addition of a small quantity of a small quadravalent cation to adjust the large/small cation balance is indicated, as was mentioned before. A slight reduction in the cadmium level (e.g. to about 0.0200 moles) would also be expected to have the same effect.

Further, with respect to Example 4, the K may be markedly increased by pulverizing or otherwise comminuting the start materials to very fine particles (e.g., less than 1 micron) as is commonly done in ceramics manufacturing operations. All of the 52 experimental formulations presented herein, did not employ such finely ground start materials and will show an increase in K of from 10 to 30% when very fine start powers are used.

All capacitors of Examples 19 through 52 experienced substantial grain growth at firing, except for those of Examples 27 and 46. This data is thus omitted from Tables III, IV and V.

Table II includes examples wherein the flux components are added as compounds of other than the oxide form (e.g., $CdTiO_3$ in Examples 21 and 22, and $Bi_2TiO_5$ in Example 20). It is demonstrated in Examples 25, 26, 28 and 29 that lead titanate may be added to improve electrical properties without changing large/small cation balance in the body, and wherein stoichiometry is adjusted by the addition of large cations (Ba) as in Examples 21 and 22 or small cations (Ti and Mn) as in Examples 19, 26, 27 and 28. The small additions of $MnCO_3$, as in Examples 27 and 28, is primarily to increase insulation resistance. In Example 29, a pre-calcined barium strontium titanate was employed in the start powders. It can be seen from the Examples of Tables I and II that so long as all of the cations in the flux and high firing ceramic powders are accounted for, it doesn't matter in what form they are included.

Each of the remaining examples (30 through 52) are represented by a point in the ternary compositional diagram of FIG. 2, and each of them either includes a large acceptor cation (of charge +1) other than cadmium or includes a small donor cation other than bismuth or niobium.

In Table II are Examples 30 through 37 wherein zinc ($Zn^{+1}$) is used as the large acceptor cation. Also $SrZrO_3$, $BaZrO_3$ and $BaSnO_3$ are alternately employed for moving the Curie temperature downward.

The large acceptor cation for Examples 38 through 44 of Table IV is copper whereas in Example 45 lithium is used. These two acceptors seem to operate during sintering as grain growth stimulating and fluxing agents on their own.

Examples 46 through 50 of Table V show that pentavalent antimony cations and hexavalent tungsten cations may be used as donors to compensate large acceptor cations in the body. Tungsten cations each combine with two cadmium cations to achieve charge balance. Molybdenum having very nearly the same sized cation of charge +6, is expected to behave in the same manner as tungsten.

Since vanadium is capable of the pentavalent cation form, it was necessary to determine experimentally whether it would behave as a small cation donor in barium titanate in the same manner as bismuth or as noibium and antimony. However, as Examples 51 and 52 demonstrate, it does not, probably because $V^{+5}$ has a radius (0.59 Å) that is smaller than that of the above mentioned donors. Instead, vanadium appears to behave as a glass former, effecting little downward shift in the Curie temperature and raising the quantity of glass-former cations in these examples to a high level.

All of the capacitors for which data appears in the Tables are chip capacitors except for the thick film monolithic capacitors of Example 27 and the monolithic ceramic capacitors each having seven buried electrodes as Examples 25, 28, 30 and 31. The monolithic capacitors were made by screen printing a 70% Ag 30% Pd electroding ink on a green ceramic layer, applying another green ceramic layer over the first, heating this laminar assembly to about 800° F. to remove the organic binders in the green layers and in the buried electrode, and firing at 1100° C. for 2½ hours in a closed container.

Alternatively, a thick film monolithic capacitor with one buried electrode is made by depositing a metal electrode on a refractory substrate as a mature ceramic, or more particularly alumina. Over this electrode is applied a green layer of a ceramic formulated in accordance with the present invention. After removal of the organic material and firing, a silver paint is applied over the fired ceramic layer and cured to complete the capacitor.

Figure 3:
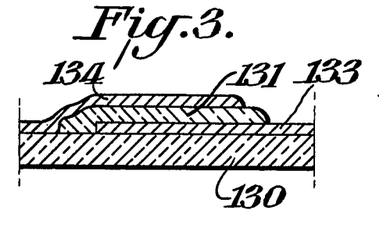
FIG. 3 shows in side sectional view a thick-film monolithic ceramic capacitor of this invention containing one buried electrode.

In this way a thick film monolithic capacitor as shown in FIG. 3 is made on a printed circuit substrate 130, consisting of ceramic layer 131 and one buried film electrode 133. An outer electrode 134 is made by applying a silver paint over the top ceramic layer 131 after firing, and heating to cure the silver paint.

Figure 4:
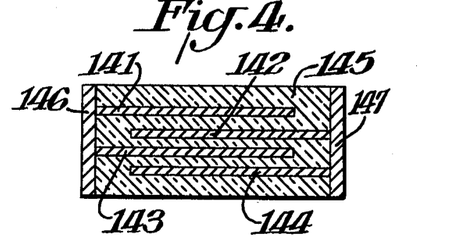
FIG. 4 shows in side sectional view a monolithic capacitor of this invention containing four buried electrodes.

A monolithic capacitor having a plurality of buried electrodes, 141, 142, 143 and 144, shown in FIG. 4, is made in the same manner except there are provided more ceramic layers with buried film electrodes interleaved therebetween prior to firing. Silver paint is then applied over the two opposite ends of the ceramic body 145. Silver terminal 146 is thus formed contacting electrodes 141 and 143 while terminal 147 contacts electrodes 142 and 144.

For firing at 1150° C. or below, the buried electrode should remain solid above about 1175° C. A 59 Pd/31 Ag alloy by weight melts at 1175° C. The buried electrodes in capacitors of this invention that may be fired to maturity at below 1150° C. may be composed of a PdAg alloy that should contain at least 30 and preferably more than 31 weight percent silver.

Figure 5:
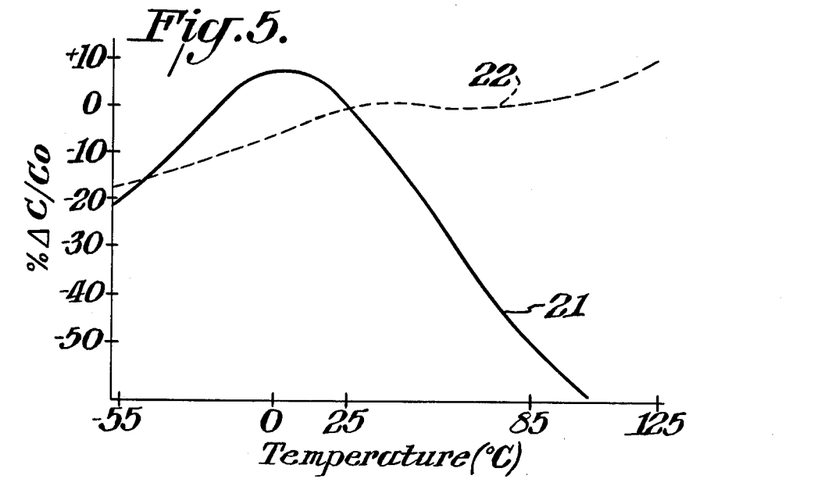
FIG. 5 shows a plot of the percent change in capacity with operating temperature for two experimental capacitors (Examples 21 and 22). The capacity at 25° C. is designated $C_o$.

The ceramic bodies of capacitors in Examples 21 and 22 exhibit drastically different dielectric properties, even though there is only a minute difference in their formulations. The room temperature K for Example 21 is over 4 times greater than that of Example 22 and the changes of K with temperature for these examples are also distinctly different as is illustrated in FIG. 5.

Figure 6:
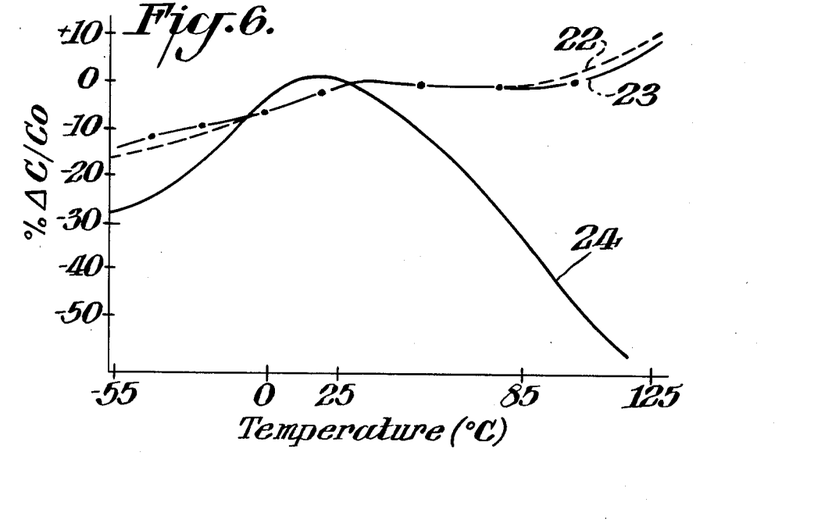
FIG. 6 shows a plot of the percent change in capacity with operating temperature for experimental capacitors (Examples 22, 23 and 24).

An even smaller difference in formulation exists between capacitors of Examples 23 and 24. There is again a great difference in the dielectric constants and the characteristic changes in K with temperature as is revealed in FIG. 6.

In a high K formulation of this invention characterized by an R less than 1, the addition of a small amount of small-cation containing material such as $TiO_2$ or $ZrO_2$ can depress the value of R and drastically change the electrical properties. From the data in Table II and FIG. 6 for Examples 22, 23 and 24, it is especially noteworthy that the addition of bismuth will have the same effects as the addition of any other uncompensated small cation.

Although the present invention is aimed primarily at the achievement of a low temperature firing ceramic body having a very high dielectric constant at about room temperature, it is apparent that formulations that are outside of but close to the narrow compositional range $0.77 \leq R \leq 1.47$, $N_{X'} < N_G$ etc., will provide excellent electrical properties for use in capacitors having moderately high capacitance and smoother temperature characteristics.

The aforementioned molar ratio criteria for ceramic formulations of this invention are seen to be surprisingly critical. For example a small change upward or downward in the number of glass-formers, or the number of large acceptor cations or the number of small donor cations amounting to as little as 0.3 percent of all the cations will drastically transform the electrical properties of a ceramic body of this invention. Practice of this invention thus will utilize the most advanced and precise methods for analyzing and metering the start materials to maintain control in production. Perhaps the most surprising finding of all is the discovery that such criticality in formulation exists for low-temperature-firing flux-containing ceramic compositions, the art rather having taught the contrary.

The experimental data verify the usefulness of the molar ratio, R, as has been defined herein. However, this general definition is an over-simplification for some groups of formulations. For instance, low melting eutectic glasses are not always formed by combining every large acceptor cation with any other small donor cation. It is known that a eutectic glass is formed by lithium and boron in a 2:1 atomic ratio. Also two monovalent cations are needed for charge compensating one hexavalent small donor. The general definition for R omits a modification to simultaneously provide for charge balance and for a more exact balance between large and small cations, in this situation. By expanding the limits for R defined herein above by about 30% ($0.5 \leq R \leq 1.9$) ceramic bodies meeting this criteria includes substantially all very high K formulations. Many moderately high K bodies but with smoother temperature characteristics are found just outside these limits, and are encompassed within the broader limits $0.4 \leq R \leq 3$.

The charge balance described above as so central to the present invention is achieved by balancing large acceptors with small donors. It is believed that some of the charge balance sought may be accomplished between acceptors and donors both of which are large or both of which are small. Thus, so long as large/small cation stoichiometry is maintained, there may be in formulations of the present invention a minor substitution of Fe, Co, Ni, Ga and Mg (small acceptor cations of charge +2 or +3) for the large acceptor cations ($N_{Cd}$ or $N_{CC}$). Likewise, large donor cations of +3 charge, e.g. yittrium and the lanthanide rare earths e.g. La, Ce, Pr, Nd, etc., may be substituted for a minor portion of the small donor pentavalent or hexavalent cations ($N_X$). In the patent application to G. Maher filed simultaneously herewith, and incorporated by reference herein, there are disclosed examples using a lanthanum donor and using a flux having a cadmium to glass-former ratio greater than unity.

TABLE I

| Ex | BaTiO$_3$ | SrZrO$_3$ | BiO$_{1.5}$ | CdO | BO$_{1.5}$ | R | Grain Growth | CdO$_x$ precip. | %G | T$_c$ (°C.) | K at 25° C. | N$\chi'$/N$_G$ |
|---|---|---|---|---|---|---|---|---|---|---|---|---|
| | | | MOLES | | | | | | | | | |
| 1 | 0.315 | 0.0354 | 0 | 0.0273 | 0.0162 | 1.69 | ⊠ | ● | 2.2 | m.p. | 3000 | 0 |
| 2 | 0.315 | 0.0354 | 0 | 0.0273 | 0.0231 | 1.18 | □ | ○ | 3.1 | 46 | 4500 | 0 |
| 3 | 0.315 | 0.0354 | 0 | 0.0273 | 0.0254 | 1.07 | □ | ○ | 3.4 | 56 | 3000 | 0 |
| 4 | 0.315 | 0.0354 | 0.0043 | 0.0234 | 0.0162 | 1.27 | □ | ○ | 1.0 | 25 | 4800 | .13 |
| 5 | 0.315 | 0.0354 | 0.0043 | 0.0234 | 0.0208 | 1.01 | □ | ○ | 2.8 | 24 | 4000 | .11 |
| 6 | 0.315 | 0.0354 | 0.0043 | 0.0234 | 0.0254 | 0.85 | □ | ○ | 3.4 | 34 | 4000 | .09 |
| 7 | 0.315 | 0.0354 | 0.0086 | 0.0234 | 0.0116 | 1.47 | □ | ● | 1.6 | −29 | 3500 | .37 |
| 8 | 0.386 | 0 | 0.0086 | 0.0234 | 0.0185 | 1.03 | □ | ○ | 1.8 | 132 | 1000 | .23 |
| 9 | 0.360 | 0.0266 | 0.0086 | 0.0234 | 0.0185 | 1.03 | □ | ○ | 2.2 | 32 | 6000 | .23 |
| 10 | 0.360 | 0.0266 | 0.0129 | 0.0234 | 0.0185 | 0.93 | □ | ○ | 2.2 | −16 | 5000 | .35 |
| 11 | 0.360 | 0.0266 | 0.0129 | 0.0234 | 0.0231 | 0.79 | □ | ○ | 2.8 | m.p. | 2000 | .28 |
| 12 | 0.354 | 0.0331 | 0.0077 | 0.0156 | 0.0093 | 1.18 | □ | ○ | 1.2 | −9 | 5500 | .41 |
| 13 | 0.364 | 0.022 | 0.0129 | 0.0058 | 0 | 0.90 | ⊠ | ○ | 0 | n.d. | 1000 | ∞ |
| 14 | 0.364 | 0.022 | 0.0129 | 0.0195 | 0 | 3.02 | ⊠ | ● | 0 | n.d. | 1000 | ∞ |
| 15 | 0.354 | 0.033 | 0.0077 | 0.0078 | 0 | 2.03 | ⊠ | ○ | 0 | n.d. | 1000 | ∞ |
| 16 | 0.384 | 0.024 | 0.0129 | 0.0136 | 0.0046 (am.B) | 1.23 | □ | ○ | 0.5 | n.d. | 4000 | 1.4 |
| 17 | 0.352 | 0.0353 | 0.0086 +0.013BaO Nb | 0.0216 (CdTiO$_3$) | 0.0139 | 0.81 | □ | ○ | 1.7 | 2 | 6000 | .29 |
| 18 | 0.347 | 0.0375 | 0.0075 (Nb$_2$O$_5$) | 0.0195 | 0.0093 (am.B) | 1.16 | □ | ○ | 1.1 | 29 | 6000 | .81 | m.p. - mixed phase
n.d. - not determined

TABLE II

| Ex. | BaTiO$_3$ | SrTiO$_3$ | PbTiO$_3$ | BaO | TiO$_2$ | CdO | BiO$_{1.6}$ | B | MnCO$_3$ |
|---|---|---|---|---|---|---|---|---|---|
| | | | | (moles) | | | | | |
| 19 | 0.351 | 0.035 | | | 0.0094 | 0.0234 | 0.0086 | 0.0139 | |
| 20 | 0.351 | 0.035 | | | 0.0086$^a$ | 0.0234 | 0.0086$^a$ | 0.0139 | |
| 21 | 0.351 | 0.035 | | 0.0130 | 0.0216$^b$ | 0.0126$^b$ | 0.0086 | 0.0139 | |
| 22 | 0.354 | 0.033 | | 0.0127 | 0.0216$^b$ | 0.0216$^b$ | 0.0096 | 0.0139 | 0.0009 |
| 23 | 0.354 | 0.033 | | 0.0127 | 0.0216$^b$ | 0.0216$^b$ | 0.0086 | 0.0139 | 0.0009 |
| 24 | 0.354 | 0.033 | | 0.0127 | 0.0216$^b$ | 0.0216$^b$ | 0.0076 | 0.0139 | 0.0009 |
| 25 | 0.354 | 0.033 | 0.0099 | | | 0.0234 | 0.0086 | 0.0143 | |
| 26 | 0.354 | 0.033 | 0.0099 | | 0.0063 | 0.0195 | 0.0107 | 0 | |
| 27 | 8.791 | 0.882 | | | 0.2347 | 0.5841 | 0.2147 | 0.3469$^c$ | 0.0217 |
| 28 | 1.415 | 0.132 | 0.040 | | | 0.0935 | 0.0344 | 0.0647$^c$ | |
| 29 | 0.431$^d$ | 0.192$^d$ | 0.033 | | 0.0139 | | 0.0139 | | |

| Ex. | R | Grain Growth | CdO$_x$ precip. | % G | N$\chi'$/N$_G$ | T$_c$ (°C.) | K at 25° C. |
|---|---|---|---|---|---|---|---|
| 19 | 0.85 | □ | ○ | 1.7 | 0.31 | −9 | 5500 |
| 20 | 0.87 | □ | ○ | 1.7 | 0.31 | −20 | 5000 |
| 21 | 0.80 | □ | ● | 1.7 | 0.35 | 2 | 6000 |
| 22 | 0.757 | ⊠ | ○ | 1.7 | 0.30 | m.p. | 1400 |
| 23 | 0.771 | ⊠ | ○ | 1.7 | 0.35 | m.p. | 1500 |
| 24 | 0.785 | □ | ○ | 1.7 | 0.31 | 19 | 4800 |
| 25 | 1.26 | □ | ○ | 1.7 | 0.27 | 9 | 6000 |
| 26 | 1.67 | □ | ● | 1.7 | 0.30 | 0 | 2000 |
| 27 | 0.82 | □ | ○ | 1.7 | 0.31 | −6 | 5400 |
| 28 | 1.10 | □ | ○ | 1.9 | 0.27 | 11 | 6200 |
| 29 | 1.00 | □ | ○ | 1.5 | 0.0 | 25 | 5500 |

NOTES:
$^a$TiO$_2$ and Bi$_2$O$_3$ introduced as Bi$_2$O$_3$ · TiO$_2$
$^b$TiO$_2$ and CdO introduced as CdO · TiO$_2$
$^c$B introduced as H$_3$BO$_3$
$^d$BaTiO$_3$ and SrTiO$_3$ introduced as Ba$_{.55}$Sr$_{.45}$TiO$_3$

TABLE III

| Ex. | BaTiO$_3$ | Zr/Sn | PbTiO$_3$ | ZnO | Nb | Bi | B | MnCO$_3$ | R | % G | T$_c$ (°C.) | K at 25° C. | N$\chi'$/N$_G$ |
|---|---|---|---|---|---|---|---|---|---|---|---|---|---|
| | | | | MOLES | | | | | | | | | |
| 30 | 8.799 | 0.798 (SrZrO$_3$) | | 0.4332 | | 0.1513 (Bi$_2$O$_3$) | 0.4348 (Am.B) | 0.0204 | .82 | 2.2 | 13 | 5600 | .17 |
| 31 | 6.900 | 0.7716 (SrZrO$_3$) | 0.9238 | 0.3686 | 0.1222 (Nb$_2$O$_5$) | | 0.2426 (H$_3$BO$_3$) | 0.0174 | 0.96 | 1.4 | 25 | 7800 | .46 |
| 32 | 0.354 | 0.0332 (SrZrO$_3$) | 0.0165 | 0.0123 | | 0.0064 (Bi$_2$O$_3$) | 0.093 (B$_2$O$_3$) | 0.0009 | 0.92 | 1.1 | 15 | 6000 | .34 |
| 33 | 0.328 | 0.0376 (SrZrO$_3$) | 0.0330 | 0.0184 | | 0.0043 (Bi$_2$O$_3$) | 0.0139 (B$_2$O$_3$) | | 1.14 | 1.6 | 15 | 5500 | .15 |
| 34 | 0.369 | 0.0398 (BaZrO$_3$) | | 0.0184 | | 0.0064 (Bi$_2$O$_3$) | 0.0162 (B$_2$O$_3$) | 0.0009 | 0.91 | 1.6 | 16 | 6000 | .09 |
| 35 | 0.334 | 0.0434 (BaZrO$_3$) | 0.0330 | 0.0184 | 0.0063 (Nb$_2$O$_5$) | | 0.0121 (B$_2$O$_3$) | 0.0009 | 0.95 | 1.4 | 8 | 6000 | .48 |
| 36 | 0.348 | 0.041 | 0.0363 | 0.0153 | 0.0052 | | 0.0121 | 0.0009 | 0.84 | 1.4 | 36 | 8000 | .40 |

TABLE III-continued

| Ex. | BaTiO$_3$ | Zr/Sn | PbTiO$_3$ | ZnO | Nb | Bi | B | MnCO$_3$ | R | % G | T$_c$ (°C.) | K at 25° C. | N$_{X'}$/N$_G$ |
|---|---|---|---|---|---|---|---|---|---|---|---|---|---|
|  |  | (BaSnO$_3$) |  |  | (Nb$_2$O$_5$) |  | (H$_3$BC$_3$) |  |  |  |  |  |  |
| 37 | 0.348 | 0.049 | 0.0363 | 0.0153 | 0.0052 |  | 0.0121 | 0.0009 | 0.84 | 1.4 | 13 | 9000 | .40 |
|  |  | (BaSnO$_3$) |  |  | (Nb$_2$O$_5$) |  | (H$_3$BC$_3$) |  |  |  |  |  |  |

TABLE IV

| Ex. | BaTiO$_3$ | SrZrO$_3$ | PbTiO$_3$ | Cu | Bi/Nb | B/Si | MnCO$_3$ | R | % G | T$_c$ (°C.) | K | N$_{X'}$/N$_G$ |
|---|---|---|---|---|---|---|---|---|---|---|---|---|
| 38 | 0.3720 | 0.0364 |  | 0.0084 | 0.0064 | 0.0046 |  | 1.07 | 0.55 | 26 | 5000 | 0.70 |
|  |  |  |  | (Cu$_2$O) | (Bi$_2$O$_3$) | (Am.B) |  |  |  |  |  |  |
| 39 | 0.3720 | 0.0364 |  | 0.0084 | 0.0064 | 0.0042 |  | 1.14 | 0.54 | 19 | 6500 | 0.76 |
|  |  |  |  | (Cu$_2$O) | (Bi$_2$O$_3$) | (SiO$_2$) |  |  |  |  |  |  |
| 40 | 0.3750 | 0.0331 |  | 0.0042 | 0.0086 | 0.0046 |  | 0.47 | 0.55 | n.d. | <1500 | 0.93 |
|  |  |  |  | (Cu$_2$O) | (Bi$_2$O$_3$) | (Am.B) |  |  |  |  |  |  |
| 41 | 0.3750 | 0.0331 |  | 0.0056 | 0.0086 | 0.0046 |  | 0.63 | 0.55 | n.d. | <1500 | 0.93 |
|  |  |  |  | (Cu$_2$O) | (Bi$_2$O$_3$) | (Am.B) |  |  |  |  |  |  |
| 42 | 0.3774 | 0.0309 |  | 0.0112 | 0.0108 | 0.0046 | .0009 | 1.02 | 0.55 | n.d. | <2500 | 1.2 |
|  |  |  |  | (Cu$_2$O) | (Bi$_2$O$_3$) | (Am.B) |  |  |  |  |  |  |
| 43 | 0.3396 | 0.0411 | 0.0330 | 0.0087 | 0.0060 | 0.0040 | 0.0009 | 0.80 | 1.0 | 30 | 6500 | 1.5 |
|  |  |  |  | (CuCO$_3$) | (Nb$_2$O$_5$) | (Am.B) |  |  |  |  |  |  |
| 44 | 0.3730 | 0.0352 |  | 0.0084 | 0.0064 | 0.0046 | 0.0009 | 0.97 | 0.55 | 8 | 6600 | 0.7 |
|  |  |  |  |  | (Bi$_2$O$_3$) | (Am.B) |  |  |  |  |  |  |
|  | BaTiO$_3$ | BaZrO$_3$ |  | Li | Bi | B | MnCO$_3$ |  |  |  |  |  |
| 45 | 0.3645 | 0.0380 |  | 0.0271 | 0.0064 | 0.0121 | 0.0009 | 1.67 | 1.4 | 20 | 6000 | 0.26 |
|  |  |  |  | (Li$_2$CO$_3$) | (Bi$_2$O$_3$) | (H$_3$BO$_3$) |  |  |  |  |  |  |

TABLE V

| Ex. | BaTiO$_3$ | BaZrO$_3$ | PbTiO$_3$ | BaCO$_3$ | CdO | X (Sb,W,V) | B (amor.) | R | % G | T$_c$ (°C.) | K at 25°C. | N$_{X'}$/N$_G$ |
|---|---|---|---|---|---|---|---|---|---|---|---|---|
| 46 | 0.369 | 0.0398 |  |  | 0.0195 | 0.0113 (Sb$_2$O$_3$) | 0.0139 | 0.77 | 1.6 | n.d. | 1000 | .81 |
| 47 | 0.369 | 0.0398 |  |  | 0.0195 | 0.0056 (Sb$_2$O$_3$) | 0.0139 | 1.0 | 1.6 | 22 | 3000 | .40 |
| 48 | 0.364 | 0.0416 |  | 0.0051 | 0.0195 | 0.0056 (Sb$_2$O$_3$) | 0.0139 | 1.4 | 1.6 | 22 | 5500 | .40 |
| 49 | 0.369 | 0.0398 |  |  | 0.0195 | 0.0028 (WO$_3$ . H$_2$O) | 0.0139 | 1.0 | 1.6 | 45 | 5200 | .20 |
| 50 | 0.334 | 0.0434 | 0.0330 |  | 0.0195 | 0.0028 (WO$_3$ . H$_2$O) | 0.0139 | 1.0 | 1.6 | 41 | 5000 | .20 |
| 51 | 0.364 | 0.0416 |  |  | 0.0195 | 0.0056 (V$_2$O$_5$)* | 0.0139 | 0.7 | 2.26** | 77 | 2000 | 0** |
| 52 | 0.364 | 0.0416 |  | 0.0051 | 0.0195 | 0.0056 (V$_2$O$_5$)* | 0.0139 | 1.3 | 2.26** | 71 | 2500 | 0** |

*V inappropriately listed as an X cation
**determined by considering V as a glass former

What is claimed is:

1. A ceramic capacitor comprising: a dielectric ceramic body, at least two spaced metal electrodes in contact with said body having a dielectric constant at 25° C. of at least 5000, said body containing a major portion of barium titanate, the positive ions in said body consisting essentially of:

a number $N_D$ of large divalent ions selected from Ba, Pb, Sr, Ca, and combinations thereof, a number $N_Q$ of small quadravalent ions selected from Ti, Zr, Sn, Mn, and combinations thereof, a number $N_X$ of donor ions capable of having a valence of greater than +4 as a small cation selected from Bi, Nb, Sb, Ta, W, Mo, and combinations thereof, a number $N_{CC}$ of charge compensating acceptor ions capable of having a valence of +1 as a large cation selected from Cd, Zn, Cu, Li, Na, and combinations thereof, and a number $N_G$ of glass-forming ions selected from B, Si, Ge, P, V, and combinations thereof wherein $$\tfrac{1}{2} N_{Bi} + N_{Nb} + N_{Ta} + M_{Sb} + 2N_W + 2N_{Mo} = N_{X'}$$

$$0.4 \leq \frac{N_{CC}}{N_{X'} + N_G - (N_D - N_Q)} \leq 3.0 \text{ and}$$

$$0.003 \leq \frac{N_G}{N_X + N_{CC} + N_G + N_D + N_Q} \leq 0.022.$$

2. The capacitor of claim 1 wherein said electrodes are buried within said body and said metal has a melting temperature of less than 1175° C.

3. The capacitor of claim 1 wherein said metal is a palladium-silver alloy of more than 30 weight percent silver.

4. The capacitor of claim 1 wherein $N_{X'}/N_G \leq 1$ and $$0.5 \leq \frac{N_{CC}}{N_{X'} + N_G - (N_D - N_Q)} \leq 1.9.$$

5. The capacitor of claim 1 wherein $N_{X'}/N_G \leq 1$, $$0.77 \leq \frac{N_{CC}}{N_{X'} + N_G - (N_D - N_Q)} \leq 1.47$$

6. The capacitor of claim 1 wherein $|N_D - N_Q| \leq 3 N_G$.

7. The capacitor of claim 1 wherein the Curie temperature of said body is from 0° to 45° C.

8. A monolithic ceramic capacitor comprising: a dielectric ceramic body having a dielectric constant at 25° C. of at least 5000, at least two spaced electrodes in contact with said body, said body containing a major portion of barium titanate, the positive ions in said body consisting essentially of:

a number $N_D$ of large divalent ions selected from Ba, Pb Sr, Ca, and combinations thereof, a number $N_Q$ of small quadravalent ions selected from Ti, Zr, Sn, Mn, and combinations thereof, a number $N_X$ of donor ions capable of having a valence of greater than +4 as a small cation selected from Bi, Nb, Ta, Sb, W, Mo, and combinations thereof, a number $N_{Cd}$ of charge compensating cadmium ions capable of having a valence of +1 as a large cation, and a number $N_G$ of glass-forming ions selected from B, Si, Ge, P, V, and combinations thereof wherein $$\tfrac{1}{2} N_{Bi} + N_{Nb} + N_{Ta} + N_{Sb} + 2N_W + \frac{2 N_{Mo}}{} = N_{X'},$$

$$N_{X'}/N_G \leq 1,$$

$$0.77 \leq \frac{N_{Cd}}{N_{X'} + N_G - (N_D - N_Q)} \leq 1.47, \text{ and}$$

$$0.003 \leq \frac{N_G}{N_X + N_{Cd} + N_G + N_D + N_Q} \leq 0.022.$$

9. The capacitor of claim 8 wherein $N_{Cd}$ may be partially replaced on a one for one basis by other ions capable of having a valence of 30 1 as a large cation selected from Zn, Cu, Li, Na, and combinations thereof.

10. The capacitor of claim 8 wherein the Curie temperature of said body lies between 0° C. and 45° C.

11. The capacitor of claim 8 wherein at least one of said metal electrodes is buried within said body, said buried metal electrode having a melting temperature of less than 1175° C.

12. The capacitor of claim 11 wherein said electrodes metal is a palladium silver alloy, said silver amounting to at least 30 weight percent of said alloy.

* * * * *

UNITED STATES PATENT AND TRADEMARK OFFICE
CERTIFICATE OF CORRECTION

PATENT NO. : 4,283,753

DATED : August 11, 1981

INVENTOR(S) : Ian Burn

It is certified that error appears in the above—identified patent and that said Letters Patent is hereby corrected as shown below:

Column 1, line 15, "May 29, 1975" should read -- May 27, 1975 --

Column 2, line 17, after "from" should appear -- Cd, --

Column 3, line 63, "2.0" should read -- 2.2 --

Column 5, line 37, "(designated ☐ )" should read -- (designated ☒ ) --

Column 7, line 6, "$N_D - N_Q < N_G$" should read -- $|N_D - N_Q| < 3N_G$ --

Column 7, line 9, "$(N'_X - \frac{1}{2} N_{Bi} + N_{Nb})$" should read -- $(N'_X = \frac{1}{2} N_{Bi} + N_{Nb})$ --

Column 10, line 64, after "application" should appear -- Serial Number 079,686 --

Columns 11 and 12, Table II, in the Heading, "$BiO_{1.6}$" should read -- $BiO_{1.5}$ --

Columns 13 and 14, Table III-continued, under the Heading B, for Examples 36 and 37, "$(H_3BC_3)$" should read -- $(H_3BO_3)$ --

UNITED STATES PATENT AND TRADEMARK OFFICE
CERTIFICATE OF CORRECTION

PATENT NO. : 4,283,753
DATED : August 11, 1981
INVENTOR(S) : Ian Burn

It is certified that error appears in the above—identified patent and that said Letters Patent is hereby corrected as shown below:

Claim 6, line 1, (Column 15, line 6), "$\leq 3$" should read -- $<3$ --

Claim 9, line 3, (Column 16, line 16), "30 1" should read -- +1 --

Signed and Sealed this

First Day of December 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,283,753
DATED : August 11, 1981
INVENTOR(S) : Ian Burn

It is certified that error appears in the above—identified patent and that said Letters Patent is hereby corrected as shown below:

In the heading on the title page under
[*] Notice:, the date in the terminal disclaimer should read -- Jan. 3, 1995 --

Signed and Sealed this

Twentieth Day of December 1983

[SEAL]

Attest:

GERALD J. MOSSINGHOFF

*Attesting Officer*     *Commissioner of Patents and Trademarks*